US008261790B2

(12) United States Patent
Wen et al.

(10) Patent No.: US 8,261,790 B2
(45) Date of Patent: Sep. 11, 2012

(54) DIRECTIONAL TREAD FOR A TIRE

(75) Inventors: Ben Baicheng Wen, Twinsburg, OH (US); Joel Joseph Lazeration, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 834 days.

(21) Appl. No.: 12/193,295

(22) Filed: Aug. 18, 2008

(65) Prior Publication Data
US 2010/0038002 A1 Feb. 18, 2010

(51) Int. Cl.
B60C 11/03 (2006.01)
(52) U.S. Cl. ............................ 152/209.28; 152/209.8
(58) Field of Classification Search ............ 152/209.28, 152/209.8
See application file for complete search history.

(56) References Cited

U.S. PATENT DOCUMENTS

| | | | | |
|---|---|---|---|---|
| 2,642,914 A | * | 6/1953 | Palko et al. | 152/209.28 |
| 4,641,696 A | * | 2/1987 | Semin et al. | 152/209.28 |
| 4,690,189 A | | 9/1987 | Bradisse et al. | |
| 4,722,378 A | | 2/1988 | Carolla et al. | |
| 4,867,219 A | | 9/1989 | Wykoff | |
| 5,002,109 A | | 3/1991 | Shepler et al. | |
| 5,176,766 A | | 1/1993 | Landers et al. | |
| 5,327,952 A | * | 7/1994 | Glover et al. | 152/209.26 |
| 5,503,206 A | | 4/1996 | Consolacion et al. | |
| 5,538,060 A | | 7/1996 | Van Der Meer et al. | |
| 5,733,393 A | * | 3/1998 | Hubbell et al. | 152/209.5 |
| 5,746,849 A | | 5/1998 | Hutson et al. | |
| 5,891,276 A | | 4/1999 | Takahashi | |
| 5,957,179 A | | 9/1999 | Graas | |
| 6,378,583 B1 | | 4/2002 | Fontaine | |
| 6,443,199 B1 | | 9/2002 | Scarpitti et al. | |
| 7,128,111 B2 | | 10/2006 | Tsuda | |

FOREIGN PATENT DOCUMENTS

| | | |
|---|---|---|
| DE | 19708613 | 9/1998 |
| EP | 0870630 | 10/1998 |
| JP | 8142609 | 6/1996 |
| JP | 2004136856 | 5/2004 |
| JP | 2005271644 | 10/2005 |
| JP | 2005306211 | 11/2005 |
| JP | 2006082633 | 3/2006 |
| JP | 2006232012 | 9/2006 |
| JP | 2007083822 | 5/2007 |
| JP | 2007112228 | 10/2007 |

* cited by examiner

*Primary Examiner* — Khanh P Nguyen
*Assistant Examiner* — Carson Gross
(74) *Attorney, Agent, or Firm* — David L King

(57) ABSTRACT

A tread for a pneumatic tire includes central tread elements and shoulder tread elements having leading and trailing tread edges. A pair of circumferentially continuous grooves, one on each half of the tread, and a plurality of lateral grooves extending from each tread edge toward the center of the tread are provided. The lateral grooves adjacent the central tread elements are curved in shape extending along a line, the line extends toward the center of the tread to form an apex from the center extending outwardly across the tread pattern changing in an opposite direction at an intersection of the circumferential groove along a second line adjacent the shoulder tread element. Shoulder tread elements are arranged in two rows, one row adjacent each lateral edge, the leading edges of the shoulder tread elements being inclined relative to the direction of rotation of the tire.

8 Claims, 8 Drawing Sheets

DIRECTIONAL TREAD FOR A TIRE

FIELD OF THE INVENTION

The present invention generally relates to tread patterns for pneumatic passenger or light truck tires, particularly to a variation of tread patterns designed to significantly reduce the rate of wear between the leading edge or heel and the trailing edge or toe of the tread elements, more particularly the rows of tread elements adjacent the tread shoulder or lateral edges.

BACKGROUND OF THE INVENTION

A pneumatic tire includes a ground contacting portion or tread, the tread having a pattern designed to provide the tire with a desirable combination of traction, durability, ride comfort and quiet operation. It is also desirable that the tread pattern provide the tire with an all-weather capability, that is a set of characteristics providing adequate performance under a variety of adverse road conditions including snow, ice, rain and mud.

The all season tire had been introduced by the Goodyear Tire and Rubber Company many decades ago and was defined by lateral extending grooves open to the side of the tread. These lateral extending grooves were oriented perpendicular to the direction of travel for at least 0.5 inches and a width of at least 0.06 inches from the open shoulder laterally inward and provided a huge improvement in snow traction, virtually reducing the need for snow tires except in the most extreme weather conditions. Such tires are defined in U.S. Pat. No. 4,690,189.

Tire tread patterns designed for traction on wet surfaces, snow and ice often feature a block type tread pattern. A block type tread pattern is characterized by a plurality of main grooves extending in a circumferential direction and a number of lateral grooves extending in a more or less axial direction. The areas of tread between the circumferential and lateral grooves are referred to a tread blocks. Tread blocks may also be defined by the edges of the tread and by grooves having other orientations. In comparison, rib-type tread patterns are characterized primarily by circumferential grooves separating circumferentially continuous ribs. Tread designs may also combine rib and block patterns.

The use of blocks as elements of a tread pattern tends to increase the level of noise generated by such tires as compared to rib-type tires. Also, as noted by U.S. Pat. No. 5,538,060, such blocks have a tendency towards irregular wear due primarily to their lack of stiffness in the circumferential direction of the tread.

It is known in pneumatic tires having a block tread pattern that normal operation of the tire produces uneven wear of the tread blocks called heel-and-toe wear. In heel-and-toe wear, the rate of wear at the toe or trailing edge of the blocks exceeds the rate of wear at the heel or leading edge of the blocks. In normal operation, the heel of each block strikes the pavement first followed by the toe. Similarly the heel of each block is lifted first from its contact with the pavement followed by the toe. In addition to reduced tread life, heel-and-toe wear increases the level of noise generated by the operation of the tire. Also, the cornering and braking performance of a tire with heel-and-toe wear may be degraded.

U.S. Pat. No. 5,891,276 discloses a variation of the block tread pattern designed to suppress heel-and-toe wear wherein a narrow block is provided outside each block, the narrow block having a surface formed to be a circular arc by setting both end parts of the narrow block to be lower than the adjacent tread block by 1.5 to 2.5 mm.

In U.S. Pat. No. 6,378,583 it was disclosed to provide an improvement that is generally applicable to the design of block tread patterns for pneumatic tires and particularly applicable to directional block tread patterns having the capability of balancing heel-and-toe wear. To balance the rate of heel and toe wear, the leading edge or heel of one or more blocks are provided with one or more notches, the notches having a variable width in the axial direction, the width generally decreasing from a maximum at the heel to a minimum in the direction of the toe. Said notches provide the tread blocks with a variable net to gross where the net to gross increases from the heel to the toe of the blocks.

In another refinement of an all season tire, Goodyear introduced a series of superior rain traction tires, Aquatread and Eagle Aquatread, with directional tread patterns. In U.S. Pat. No. 5,176,766 it was reported the use of aqua-channel large circumferential grooves 11 with a width 7 to 12 percent of tread width combined with a network of generally curved inclined lateral grooves 15 flowing over the tread shoulders could greatly enhance wet traction. As shown in prior art FIG. 3, the aqua-channel 11 was connected to curved lateral grooves 15 and the water was directed into the large groove 11 and into the lateral grooves 15 to be expelled through the channel 11 or through the lateral grooves 15. It was believed important that the inclination of the lateral grooves 15 did not channel water back into the center groove 12. In U.S. Pat. No. 5,503,206 and U.S. Pat. No. 5,957,179 it was particularly noted that these directional treads should never have the lateral grooves oriented such that water is directed to the center of the tread and therefore the orientation is such the axially inner portions of a lateral groove and the leading edges 17 and trailing edges 19 of the tread elements 18 must always enter the footprint or contact patch prior to the axially outer portions accordingly any inclination other than 90 degrees had to be inclined or sloped away from the contact patch as the grooves 15 extended axially outwardly.

These design constraints while believed to improve traction, have been found to contribute to irregular heel toe wear in the shoulder block elements. This irregular wear is exaggerated or reduced depending on the shape of the tire's footprint or contact patch shape.

In U.S. Pat. No. 6,443,199 footprint shapes were determined to greatly influence tread wear. The goal in that patent was to develop tires wherein the footprint regardless of load operated in a range of footprint shape factors that would permit tire treads to be optimized to avoid the need for tire rotation to minimize tread wear. In that prior art patent which the present invention incorporates herein by reference in its entirety, measuring a tire's footprint and calculating a footprint shape factor (FSF) are explained.

After the tire is broken in using the ASTM break-in procedure for the tire the footprint shape can be determined.

To measure the footprint shape a tire is either inked and pressed against a paper or cardboard sheet which is laid on a flat hard surface at a fixed load and with the tire inflated at a fixed pressure leaving the impression of the tread on the paper or cardboard surface. This technique of footprinting is old in the tire art and is commonly understood. Alternatively, inkless procedures are also available which include carbonless paper, pressure sensing pads and the like. In all cases, one of the objectives is to get the tread contacting surfaces within the footprint defined.

Once the tire engineer has the footprint shape he or she can make several observations or predictions about the tire and its tread.

Historically, the butterfly shaped footprint was determined to be undesirable. Alternatively, the footprints having a shape similar to the bow of a boat were considered desirable for pushing water away from the center of the tread. As shown in FIGS. 1 and 2 the prior art tire exhibits this bow shape of footprint.

Inherently, when the leading and trailing edges of the footprint are not axially extending, that is if they are curved or bowed, this means that as the tire rolls a portion of the tread contacts the ground first and laterally adjacent tread elements follow. This can cause a phenomenon known as tread element squirm. As the tread elements leave the treads footprint the elements snap out of the contact patch as the pressure holding the element against the road is released. The elements lightly contacting the road are slid across the roadway wearing the element similar to sliding rubber eraser across a sheet of paper. Those inventors believed ideally the tread elements should have a uniform pressure distribution laterally across the tread and more preferably the leading and trailing edges of the footprint should be axially extending in a straight line path under all operating conditions.

To better understand this ideal relationship, they developed a concept and methodology to define the footprint shape factor which is shown in prior art FIGS. 1 and 2.

First, the maximum axial width W of the footprint is measured. Then, the distance halfway between the maximum axial width W is defined as the tire's centerplane CP. A distance 40% of the tread width (W) on each side of the centerplane is located as shown as reference numerals 2, 4. A circumferential line 5, 6 is drawn through points 2-2 and 4-4 respectively and the length of line $Ls_1$ and $Ls_2$ is calculated, summed and divided by 2 to arrive at an average shoulder length A. The footprint length $L_c$ at the centerplane is measured. The footprint shape factor F is the ratio of $L_c/L_s$.

As shown the footprint shape factor F of the prior art tire was 1.12 at normal inflation and normal load, at the same pressure and at 50% load the footprint shape factor F is 1.50. As can be easily appreciated the footprint's shape is very different at these different loads.

In light truck tires this variation in loading is a greater problem than in passenger tires.

The present invention has remarkably found a great improvement in irregular tread wear can be achieved using lateral groove orientations that completely go against the conventional thinking of those skilled in the art of tire tread engineering and design. Furthermore, they have conducted studies confirming the use of this new inventive tread pattern design while reducing heel toe wear dramatically in the shoulder tread elements, causing at most only minor degradation in wet or dry traction performance.

SUMMARY OF THE INVENTION

An all season radial pneumatic passenger or light truck tire having a radially outer tread, the tread having a plurality of tread elements defined by grooves arranged circumferentially and laterally around the tread between a pair of lateral tread edges to define a tread pattern. The tread has a plurality of tread elements extending across the width of the tread between the lateral edges including central tread elements and shoulder tread elements having leading and trailing tread edges. The shoulder tread elements are arranged in two rows, one row adjacent each lateral edge. At least one row of shoulder elements has the leading edges inclined relative to the direction of rotation of the tire having an axially outward portion of the leading edge entering and exiting a footprint contact patch prior to the axially inner portion of the leading edge of the shoulder tread elements. The leading edges of one row of shoulder elements can be oriented equal but oppositely directed relative to the leading edges of the other row, preferably the leading edge of the shoulder tread elements are inclined greater than 0 degrees, preferably 10 degrees or greater relative to a plane perpendicular to an equatorial centerplane EP of the tire. The pneumatic tire can have a non-directional tread pattern wherein both rows of shoulder tread elements are directionally oriented in the same direction, most preferably the tread pattern is directional having equal, but oppositely oriented shoulder tread elements. Preferably the leading edges of each shoulder element are equally oriented and the leading edge of each shoulder element is inclined at an angle of 10 degrees or greater relative to a plane perpendicular to an equatorial centerplane EP of the tire, and wherein the tire has a tread footprint pattern that has a footprint shape factor of 1.25 or less approaching 1.0.

The preferred pneumatic tire has a directional tread pattern wherein the plurality of tread elements extend across the width of the tread between the lateral edges and include central tread elements and shoulder tread elements each tread element having a leading edge and a trailing edge. A first line extends along the leading edges of laterally adjacent central tread elements has a generally "V" like or chevron shape laterally inward of the lateral edges extending to an apex where the apex of the "V" or chevron first enters a contact patch of the tire as it rotates in a forward direction prior to the remaining portions of the leading edges, and the shoulder tread elements are arranged in two circumferential rows, one adjacent each lateral edge, wherein the leading edges have an inclination directionally opposite to the leading edges of the central tread elements and a second line extending along the leading edge of the shoulder elements is connected to the first line and axially outer portions of the leading tread edge of each shoulder element enters the contact patch prior to an axially inner portion of the leading edge of the shoulder elements and upon exiting the contact patch the axially outer portions of the shoulder elements exit prior to the axially inner portions while the central tread elements have the apex and axially inner portions of the central tread elements exit the central patch prior to axially outer portions. The directional tread may be symmetric about the centerline of the tread or asymmetric.

DEFINITIONS

The following definitions are controlling for the disclosed invention.

"Axial" and "Axially" means the lines or directions that are parallel to the axis of rotation of the tire.

"Axially Inward" means in an axial direction toward the equatorial plane.

"Axially Outward" means in an axial direction away from the equatorial plane.

"Bead" or "Bead Core" generally means that part of the tire comprising an annular tensile member of radially inner beads that are associated with holding the tire to the rim.

"Belt Structures" or "Reinforcement Belts" or "Belt Package" means at least two annular layers or plies of parallel cords, woven or unwoven, underlying the tread, unanchored to the bead, and having both left and right cord angles in the range from 18 degrees to 30 degrees relative to the equatorial plane of the tire.

"Carcass" means the tire structure apart from the belt structure, tread, undertread over the plies, but including the beads.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Directional Tread Pattern" means a tread pattern designed for specific direction of rotation.

"Equatorial Plane" means the plane perpendicular to the tire's axis of rotation and passing through the center of its tread; or the plane containing the circumferential centerline of the tread.

"Footprint" means the contact patch or area of contact of the tire tread with a flat surface under normal load pressure and speed conditions.

"Groove" means an elongated void area in a tread that may extend circumferentially or laterally in the tread in a straight, curved or zigzag manner. It is understood that all groove widths are measured perpendicular to the centerline of the groove.

"Lateral" means a direction going from one sidewall of the tire towards the other sidewall of the tire.

"Net to gross" means the ratio of the net ground contacting tread surface to the gross area of the tread including the ground contacting tread surface and void spaces comprising grooves, notches and sipes.

"Notch" means a void area of limited length that may be used to modify the variation of net to gross void area at the edges of blocks.

"Ply" means a cord-reinforced layer of rubber coated radially deployed or otherwise parallel cords.

"Radial" and "radially" mean directions radially toward or away from the axis of rotation of the tire.

"Radial Ply Tire" means a belted or circumferentially-restricted pneumatic tire in which at least one ply has cords which extend from bead to bead are laid at cord angles between 65 degrees and 90 degrees with respect to the equatorial plane of the tire.

"Shoulder" means the upper portion of sidewall just below the tread edge.

"Sidewall" means that portion of a tire between the tread and the bead.

"Sipe" means a groove having a width in the range of 0.2% to 0.8% of the tread width. Sipes are typically formed by steel blades having a 0.4 to 1.6 mm, inserted into a cast or machined mold.

"Tangential" and "Tangentially" refer to segments of circular curves that intersect at a point through which can be drawn a single line that is mutually tangential to both circular segments.

"Tread" means the ground contacting portion of a tire.

"Tread width" (TW) means the greatest axial distance across the tread, when measured (using a footprint of a tire,) laterally from shoulder to shoulder edge, when mounted on the design rim and subjected to a specified load and when inflated to a specified inflation pressure for said load.

"Void Space" means areas of the tread surface comprising grooves, notches and sipes.

BRIEF DESCRIPTION OF THE DRAWINGS

The invention will be described by way of example and with reference to the accompanying drawings in which.

DETAILED DESCRIPTION OF THE INVENTION

Figure 4:
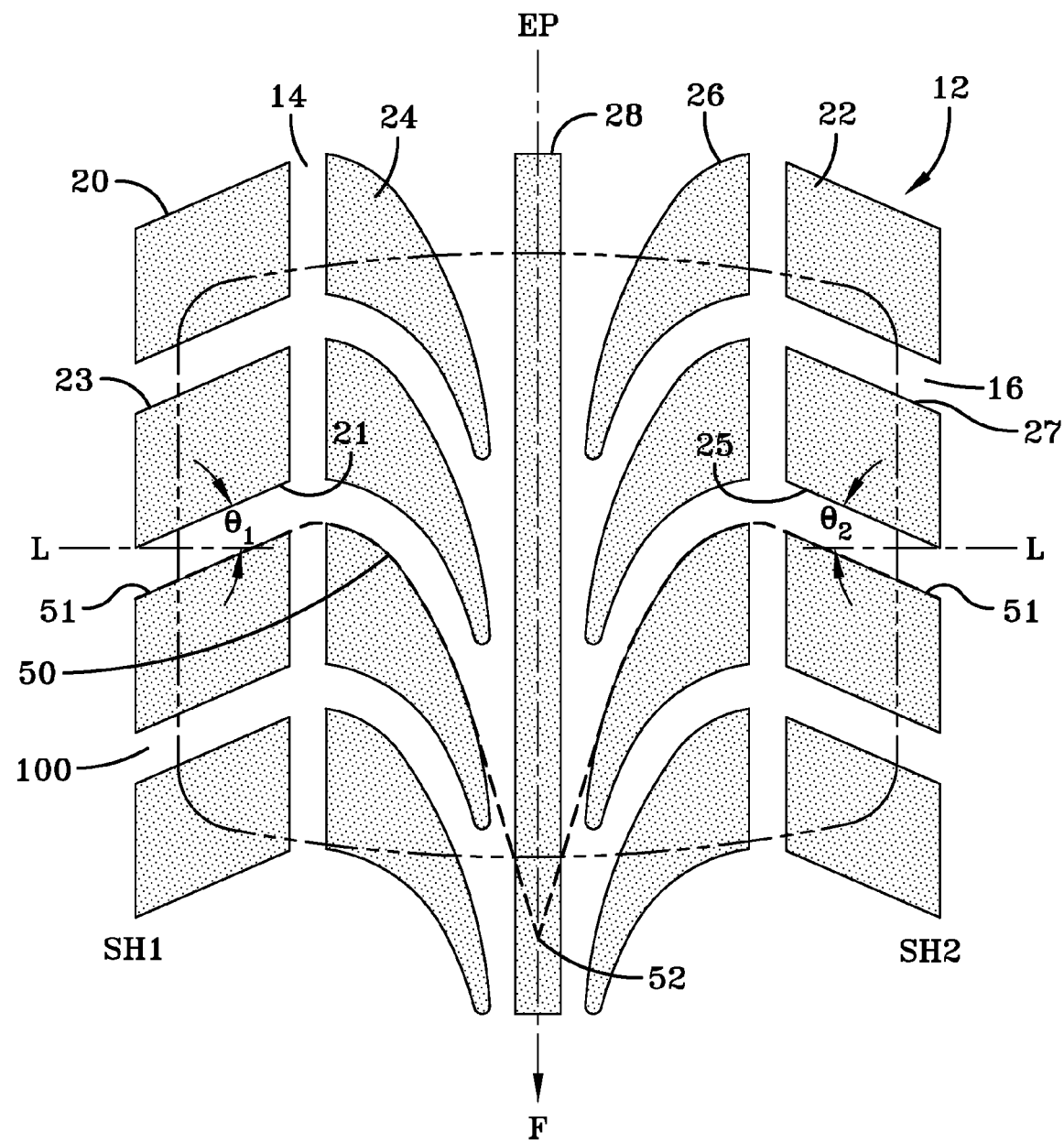
FIG. 4 is a portion of a directional tread pattern for a tire made in accordance with the present invention.
Figure 4A:
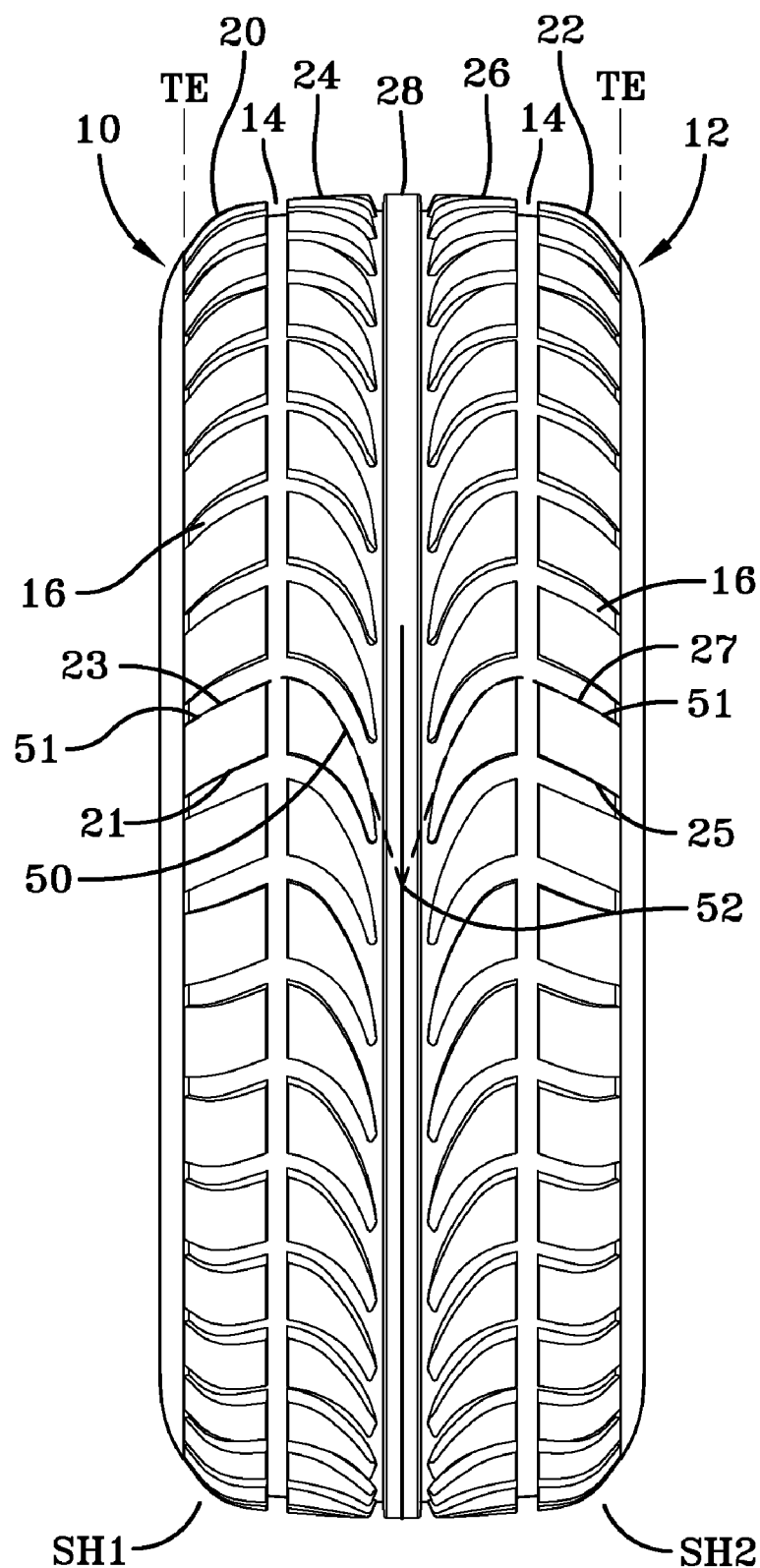
FIG. 4A is a plan view of a tire employing the tread shown in FIG. 4.

With reference to FIG. 4A, a pneumatic passenger or light truck tire 10 made according to the present invention has a tread 12 which has a plurality of tread elements defined by grooves around circumferentially and laterally around the tread between a pair of lateral tread edges TE to define a tread pattern. The present inventive tread 12 is for passenger and light truck radial tires. Such radial tires are generally inflated to pressures under normal load in the range of 28 to 45 psi. At these low pressures when the tires are lightly loaded the problems of heel and toe wear are most noticeable. By comparison heavy duty truck and bus tires operate at inflated pressures of 80 to 120 psi at much higher loads. Most of these tires avoid the heel/toe wear issues by using shoulder ribs for highway and paved road usage. Some tires have block elements in the shoulders on rear drive tires but front steer tires most typically use circumferentially continuous ribs to avoid vibration and tread wear issues generally. The present invention provides a design concept of superior performance in all wheel positions.

As shown in FIGS. 4A and 4, the tread 12 has a plurality of tread elements extending across the width of the tread between the lateral edges TE including central tread elements 24, 26 and 28. Tread elements 24 and are identically shaped however oppositely oriented, tread element 28 is a central rib which is circumferentially continuous and extending about the circumference of the tire. The tread 12 further has a pair of shoulder tread elements arranged in rows. The first row SH1, is defined by tread elements 20. The second shoulder row SH2 is defined by tread elements 22. These shoulder elements shapes and orientation are further defined by circumferential grooves 14 on each half of the tread 12 as well as lateral grooves 16 extending from a tread edge TE to the center portion of the tread 12 as shown. These grooves 16 are curved in shape adjacent the central tread elements and extend along a line 50, the line 50 extends toward the center forming an apex 52 from the center of the tread extending outwardly across the tread pattern changing in an opposite direction at the intersection of the circumferential groove along a second line adjacent the shoulder tread elements 20 and 22, and flow over the tread edge TE as shown. The shoulder tread elements 20 each have a leading edge 21 and a trailing edge 23, while the shoulder elements 22 have a leading edge 25 and a trailing edge 27 as illustrated.

With further reference to FIG. 4, a footprint of a portion of the tread 12 is illustrated. The contact patch or footprint 100 is shown in a dashed line which is generally rectangular in shape. This footprint shape or contact patch shape as shown is defined as somewhat squarish. A somewhat squarish footprint has a footprint shape factor of approximately 1.25 or less, preferably approaching 1. Had this footprint shape factor been more rounded, a footprint factor of 1.5 or more would have been exhibited, in such a case the central region would have been substantially longer in length while the lateral edges of the footprint would be shorter in length creating a more oval shape of the footprint. As illustrated, however, the exemplary tire 10 shows a more squarish footprint pattern. As illustrated, the leading edge 21 of each shoulder element 20 in the first shoulder region SH1 has an angle of the leading edge $\theta_1$, $\theta_1$ as shown is a straight line angle wherein the angle is measured from a perpendicular of the equatorial plane EP of the tire. The perpendicular line as shown, L, extends as either a line or a plane intersecting perpendicular to the equatorial plane. The angle $\theta_1$ as shown in the exemplary tire 10, preferably is 10 degrees or greater. On the opposite side of the tire the shoulder row SH2 has tread elements 22 wherein the leading edge 25 exhibit an angle $\theta_2$. As illustrated the angle $\theta_2$ as measured from the line L to the leading edge is equal but opposite to the angle $\theta_1$ on the opposite shoulder. Both of these orientations ensure that as the tire 10 travels in a forward direction as indicated by the F on FIG. 4, the axially outer portions at the leading and trailing edge both enter and exit the contact patch 100 prior to the axially inner portions of the leading and trailing edges. As such as the tire 10 rotates the outer portions of the tread 12 will first come into contact with the contact patch 100 and as the tire 10 continues to rotate, this leading axially outer portion of either the trailing or leading edges will exit first while the axially inner portions of the leading and trailing edges will enter or leave the contact patch following these axially outer portions. Typically, and it is important to note that the axially extending grooves 16 have a width of at least 0.060 inches as defined by measuring perpendicularly between the leading and the trailing edges. This width ensures that the groove 16 remains open as it passes through the footprint of the tire 10 and is not to be confused with a sipe, incision or other narrow groove which would tend to close up as the tire 10 enters or leaves the footprint of the tire. In this fashion the leading and trailing edges are neither supported by an adjacent element nor are there any other influences regarding the normal heel/toe wear that would be experienced.

Traditionally all season tires have these lateral grooves extending at approximately 0 degrees relative to the line L as they exited over the tread shoulder, this provided what was believed to be increased traction for the tire. As such the tread element was designed specifically so that these lateral grooves were always oriented at approximately 0 degrees. What has been determined however, is that 0 degrees is not an optimum orientation for leading or trailing edges of the shoulder block elements 20, 22, in that pronounced heel/toe wear can occur at this orientation. In some tread patterns similar to FIG. 4, the belief was that the lateral groove 16 should flare out and continue a flow pattern opposite to the direction of forward travel, so the water was ejected outward and not pushed back towards the center of the tread. This was particularly important it was believed in certain aqua-channel tires. What was determined however, and this study of the present invention has confirmed this actually enhances heel/toe wear and creates a pronounce negative effect with regard to abrasion occurring on leading and trailing edges of such shoulder block elements.

Figure 5:
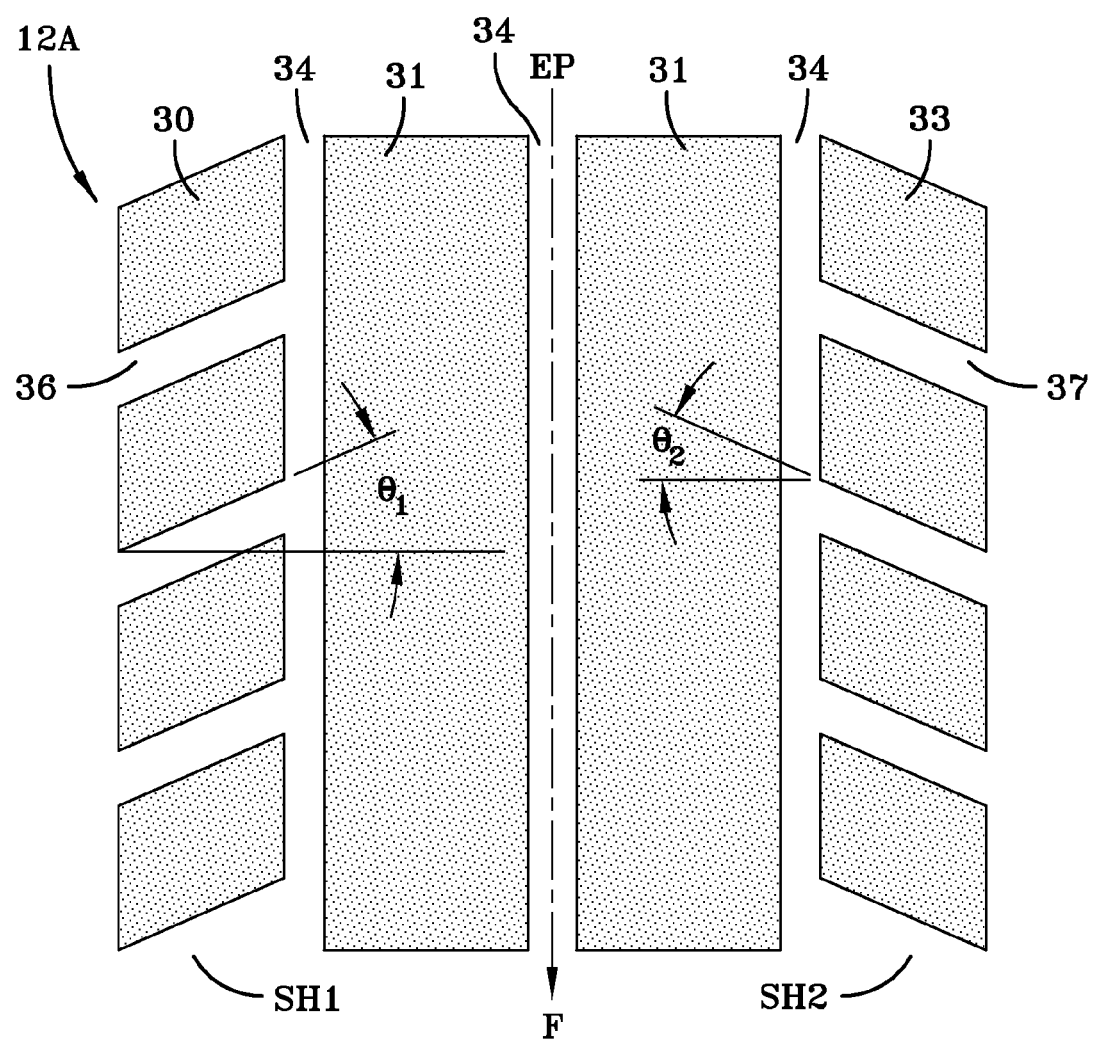
FIG. 5 is a portion of a directional tread pattern for a tire made in accordance with the present invention.

What is remarkable about the lateral grooves 16 is that it not only flows over the shoulder but actually changes its orientation as it approaches the shoulder, such that the groove 16 is oriented in a fashion that is opposite to the more central regions of the tread elements 24 and 26. This is significant in that one would typically believe this would create a pushing of the water under wet traction conditions towards the center portion of the tread 12, however it has been found that the shoulder tread elements 20, 22 can be oriented such that the angle $\theta_1$ and $\theta_2$ can be as illustrated in FIGS. 4, 4A and 5 as will be discussed. These orientations while inclined such that the axially outer portions of the tread elements 20, 22 enter and leave the contact patch first prior to the remaining axially inner portions of the shoulder tread elements has been found extremely beneficial in heel/toe wear. Additionally, while creating improved heel/toe wear there has been no significant detrimental effect with regard to the traction and traction performance of the tire 10 as it relates to these inclinations. Historically 90 degrees was believed to create the maximum traction capabilities, however at 10 degrees or greater no significant drop-off in traction has been noted as the tire enters and leaves the footprint contact patch.

With reference to FIG. 5, a tread pattern 12A is illustrated. The tread pattern 12A as shown is very similar to that of FIG. 4 with the exception that the center tread elements are shown as ribs 31 spaced by circumferentially continuous grooves 34. This is done just for simplification purposes and this tire was actually carved to generate specific heel/toe wear performance data so that it could be compared with other orientations. The angles $\theta_1$ and $\theta_2$ are equal but oppositely oriented relative to the circumferential center plane or equatorial plane EP of the tire. $\Theta_1$ was carved at 0 degrees orientation or a standard all season type orientation of 0 degrees and at angles of −10, −20 and −30 degrees and test data was gathered with regard to heel/toe wear. Each tire was tested for over 8,000 miles and the amount of abrasion on the leading and trailing edges was measured. The average of those measurements was normalized and recorded as illustrated in chart 8. The tread element 30 in the shoulder row SH1 as illustrated is spaced by inclined grooves 36 that intersect the circumferential grooves 34. On the opposite side, shoulder row SH2 has the lateral grooves 37 defining the tread elements 33. As discussed, the orientation of the leading and trailing edges are equal but opposite such that an angle of inclination $\theta_1$ exists on the shoulder row SH1 whereas an angle $\theta_2$ equal but opposite exists on shoulder row SH2. In this example because the angle orientation is equal but opposite, each of the shoulder rows have a performance characteristic as defined in chart 8. As shown, the exemplary tire in FIG. 5 is directional such that it has a preferred forward direction of travel and therefore would always be mounted on a vehicle with a forward direction F.

Figure 6:
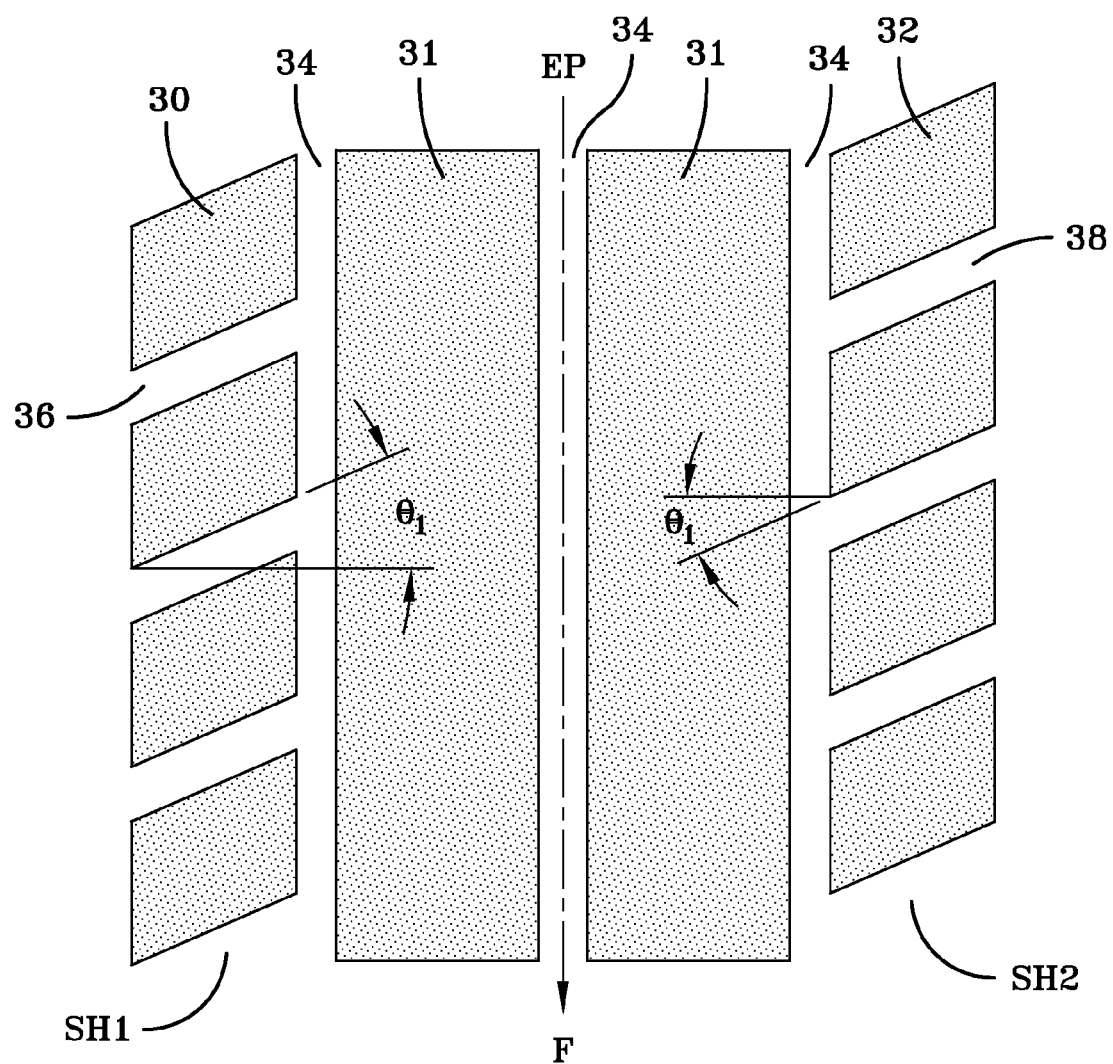
FIG. 6 is a portion of a non-directional tread made in accordance with the present invention.
Figure 7:
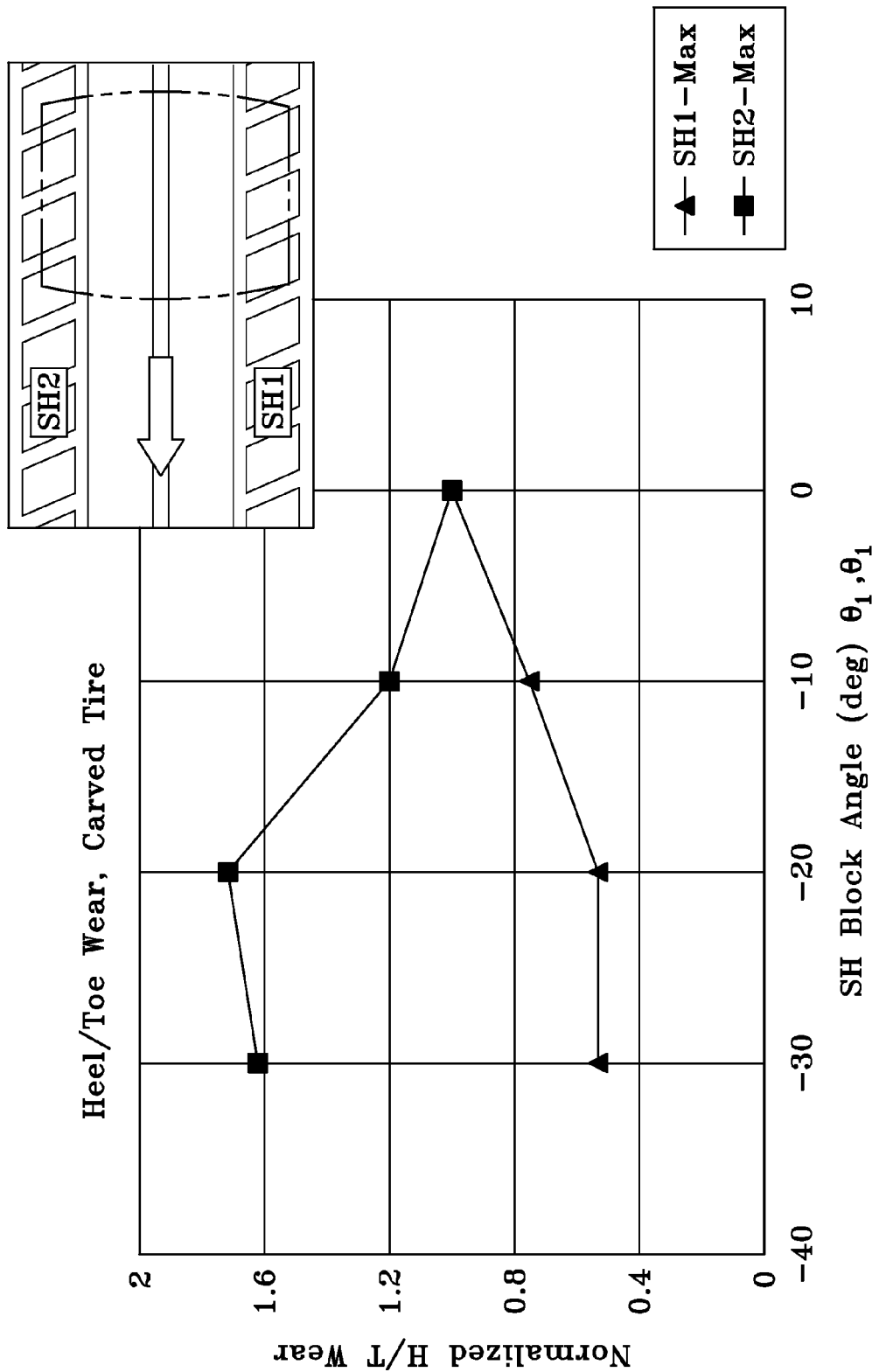
FIG. 7 is a chart showing the heel/toe wear performance of the shoulder tread elements, one graph showing the leading and trailing edges inclined with the axially outer tread edge portions entering and exiting the contact patch first at angles 0, −10, −20 and −30 and the other line showing the opposite shoulder similarly inclined but having the axially inner portions entering and exiting the contact patch first, this graphical depiction would apply to the non-directional tire of FIG. 6.

With reference to FIG. 6, another exemplary tire is illustrated using the same reference numerals, however except for the shoulder rows SH2 wherein the shoulder elements 32 are defined by lateral grooves 38 which intersect the circumferential grooves 34. In this case, both the shoulder elements SH1, SH2 have their leading and trailing edges of the shoulder elements inclined at an angle $\theta_1$, since both of the lateral grooves are extending in the same direction with the same orientation relative to the equatorial plane of the tire. In this case the tire is non-directional, has no preferred forward or rearward direction. Accordingly, a tire made in this example would be a conventional type tire with the exception of the angle $\theta_1$ on the shoulder SH1 as shown would enter or leave the footprint patch first on the axially outer portion of the leading and trailing edges whereas the shoulder elements SH2 on the right hand side of the figure would have the axially inner portions first entering and leaving the footprint patch as shown. In this example, the performance of the tread is exhibited in chart 7. Chart 7 has a pronounce difference between shoulder SH1 and shoulder SH2, in this fashion improved tread wear is found with the tread elements 30 on shoulder SH1, there is a dramatic reduction from having a 0 degree orientation, however, the combination of having $\theta_1$ equal and at the same orientation means that the axially inner portions of the tread elements 32 having inclined grooves 38 such that the leading and trailing edges on the axially inner portions of the leading and trailing edges enter the contact patch first means that the tread wear actually worsens such that heel/toe wear substantially be greater using this orientation, as such it was possible to notice that such an orientation while achieving a benefit on one shoulder SH1 would create an opposite detriment on the opposite shoulder SH2. While it was considered feasible to design such a tread, it is noted that one arguably could use angles between 0 and 10 degrees without a significant degradation and that rotation of the tire could permit for this type of tire to perform adequately. It is believed that such a non-directional tire may not be particularly useful or beneficial over a 0 degree conventional application.

Figure 1:
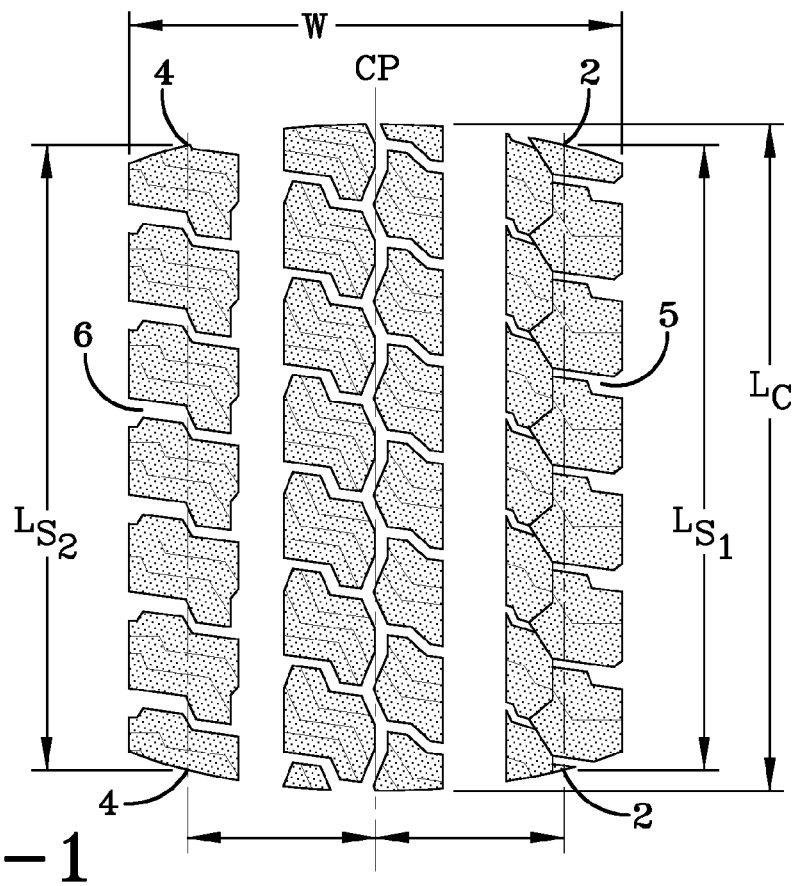
FIG. 1 is an exemplary prior art tire tread contact patch under normal load and inflation.
Figure 2:
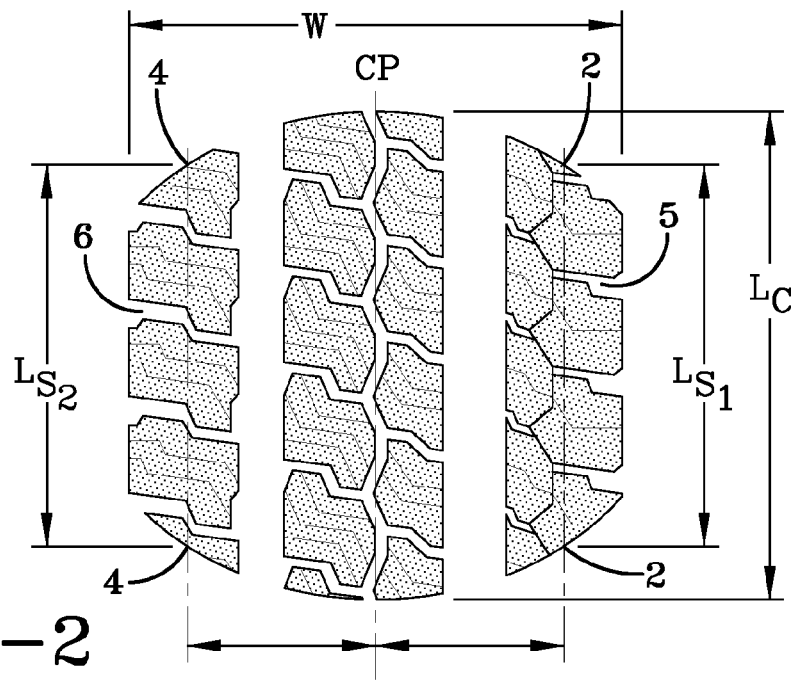
FIG. 2 is the exemplary prior art tire of FIG. 1 showing the contact patch at 50 percent load under normal inflation. Both FIGS. 1 and 2 providing illustrations for defining how footprint shape factors are measured.
Figure 3:
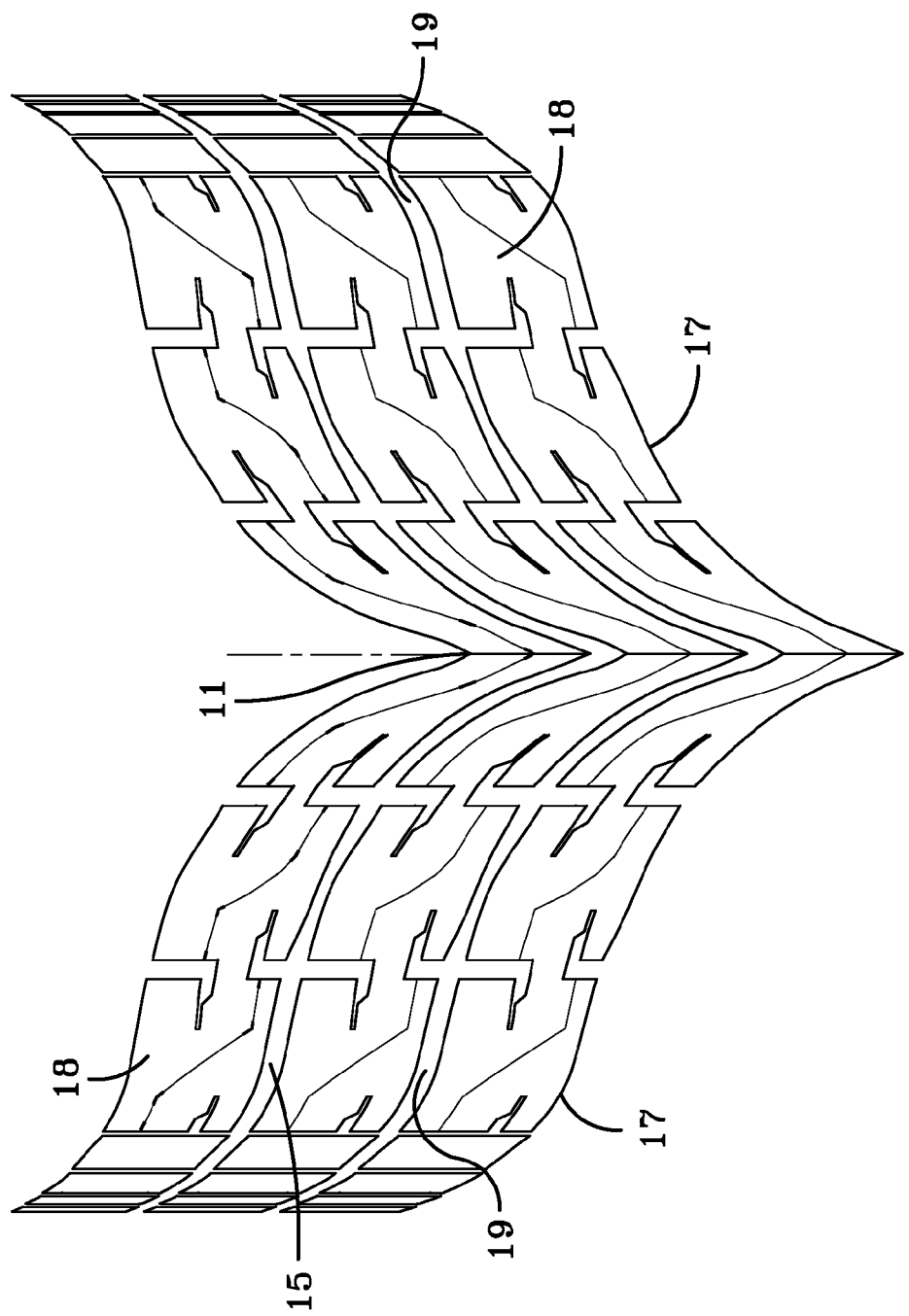
FIG. 3 is a prior art depiction of a portion of a direction tread pattern for a tire made in accordance with U.S. Pat. No. 5,176,766.
Figure 8:
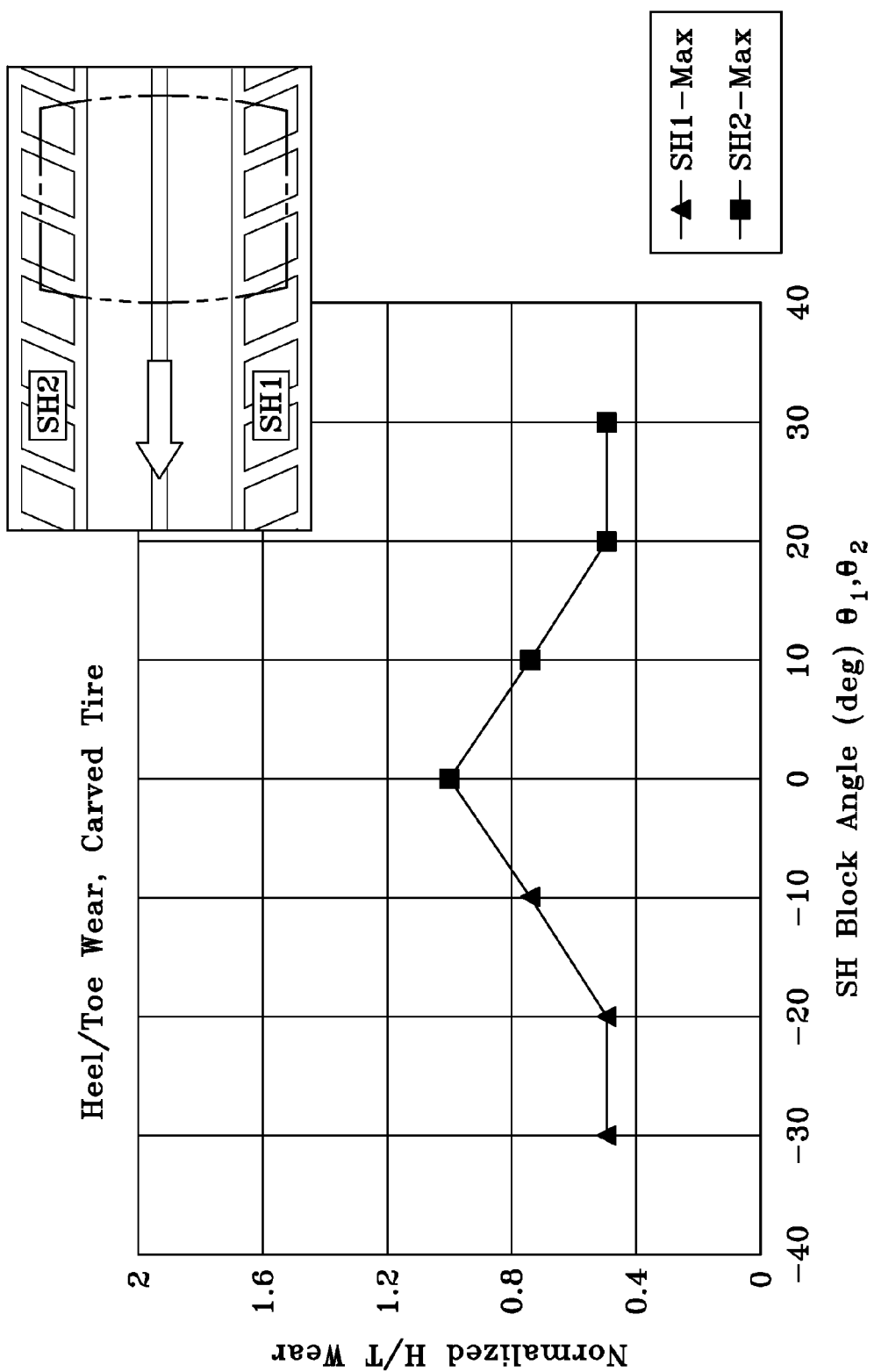
FIG. 8 is a chart showing the improved heel/toe wear of both shoulders as shown in FIGS. 4, 4A and 5 of the directional tread which has the leading and trailing edges equal but oppositely oriented to reflect both shoulders tread elements having the axially outer portions of the leading and trailing edges entering and exiting the contact patch first.

With regard to non-directional tires, however, it is possible to achieve an asymmetric tire wherein a shoulder rib may be provided substantially similar to the prior art tire shown in FIGS. 1 and 2 of the prior art, however, the lateral grooves 36 could be oriented at $\theta_1$ using the present invention on one shoulder SH1. This would create an asymmetric tire having at least one tread element 30 using the inclination $\theta_1$ as shown wherein beneficial heel/toe results could be achieved wherein the axially outer portions of the leading or trailing edges of the shoulder elements 30 would enter the footprint first and exit first while the remaining portions of the tread remained in the footprint patch until exited after the axially outer portion. When this occurs beneficial results can occur with regard to the heel/toe wear as illustrated in the chart of FIG. 8.

As shown from the charts it is clear that any orientation other than 0 degrees wherein the axially outer portion of the shoulder tread element 20, 22, 30, 33 enters the contact patch prior to the remaining portions of the tread element along the leading and trailing edges will improve the heel/toe wear. Accordingly, any angle greater than 0 through −30 will achieve beneficial results. To achieve marked improvement, the inclination should be at least 10 degrees preferably greater than 10 degrees achieves maximum benefit with regard to heel/toe wear. Additionally as shown in the studies, it is believed that minimal loss in either traction on dry pavement or wet traction would be seen as a result of employing these inclinations. These inclinations can be further enhanced by more aggressive of lateral grooves within the central tread elements, which are much less prone to heel/toe wear than those tread elements in the shoulder rows SH1 and SH2. As determined, the present invention provides a novel way to improve heel/toe wear and significantly reduce this form of irregular wear which could lead to premature removal of a tire due to excessive irregular wear and will greatly enhance the overall tread life of the tire significantly while not detrimentally affecting either traction or ride performance. As shown, this orientation heretofore was always avoided as it was believed detrimental traction performance without providing any benefit. The inventors of the present invention have discovered unexpectedly that a dramatic improvement in heel/ toe wear can be achieved repeatedly by using this type of orientation in the shoulder tread elements. As shown the angles $\theta_1$ and $\theta_2$ were shown equal, but oppositely oriented. This concept is not limited to such equal angles as $\theta_1$ can also be set greater than or less than $\theta_2$ if so desired.

Other variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An all season radial pneumatic passenger or light truck tire having a radially outer tread, the tread having a plurality of tread elements defined by grooves arranged circumferentially around the tread between a pair of lateral tread edges to define a directional tread pattern, the tread comprising:
   a plurality of tread elements extending across the width of the tread between the lateral edges including central tread elements and shoulder tread elements having leading and trailing tread edges,
   a pair of circumferentially continuous grooves, one on each half of the tread separating the laterally adjacent central tread elements and the shoulder elements;
   a plurality of lateral grooves extending from each tread edge TE toward the center portion of the tread, the lateral grooves adjacent the central tread elements are curved in shape extending along a line, the line extends toward the center to form an apex from the center of the tread extending outwardly across the tread pattern changing in an opposite direction at an intersection of the circumferential groove along a second line adjacent the shoulder tread element; and
   wherein the shoulder tread elements are arranged in two rows, one row adjacent each lateral edge, wherein each row of shoulder elements has the leading edges inclined relative to the direction of rotation of the tire having an axially outward portion of the leading edge entering and exiting a footprint contact patch prior to the axially inner portion of the leading edge of the shoulder tread elements and the central tread elements laterally adjacent to the shoulder elements have the leading edges inclined directionally opposite to the orientation of the leading edges of the shoulder elements wherein the axially inner portions of the central tread element enter the footprint contact patch prior to the axially outer portions, and wherein the tire has a tread footprint pattern that has a rectangular or squarish footprint shape factor between 1.25 to 1.0.

2. The all season radial pneumatic passenger or light truck tire of claim 1 wherein the leading edge of the shoulder tread elements are inclined 10 degrees or greater relative to a plane perpendicular to an equatorial centerplane EP of the tire.

3. The all season radial pneumatic passenger or light truck tire of claim 1 wherein the leading edge of each shoulder element is inclined at an angle of 10 degrees or greater relative to a plane perpendicular to an equatorial centerplane EP of the tire.

4. The all season radial pneumatic passenger or light truck tire of claim 3 wherein the leading edges of each shoulder element is equally oriented.

5. An all season radial pneumatic passenger or light truck tire having a radially outer tread, the tread having a plurality of tread elements defined by grooves arranged circumferentially around the tread between a pair of lateral tread edges to define a tread pattern, the tread comprising:

a directional tread pattern wherein the plurality of tread elements extend across the width of the tread between the lateral edges and include central tread elements and shoulder tread elements each tread element having a leading edge and a trailing edge, and a first line extending along the leading edges of laterally adjacent central tread elements forms a generally "V" like or chevron shape laterally inward of the lateral edges extending to an apex where the apex of the "V" or chevron first enters a contact patch of the tire as it rotates in a forward direction prior to the remaining portions of the leading edges of the central tread elements, a pair of circumferentially continuous grooves, one on each half of the tread separating the laterally adjacent central tread elements and the shoulder elements;

a plurality of lateral grooves extending from each tread edge TE toward the center portion of the tread, the lateral grooves adjacent the central tread elements are curved in shape extending along a line, the line extends toward the center to form an apex from the center of the tread extending outwardly across the tread pattern changing in an opposite direction at an intersection of the circumferential groove along a second line adjacent the shoulder tread element; and the shoulder tread elements are arranged in two circumferential rows, one row adjacent each lateral edge, wherein the leading edges of each shoulder tread element is inclined directionally opposite to the leading edges of laterally adjacent central tread elements and a second line extending along the leading edge of the shoulder elements is connected to the first line and axially outer portions of the leading tread edge of each shoulder element enters the contact patch prior to an axially inner portion of the leading edge of the shoulder elements and upon exiting the contact patch the axially outer portions of the shoulder elements exit prior to the axially inner portions while the central tread elements have the apex and axially inner portions of the central tread elements exit the central patch prior to axially outer portions, and wherein the tire has a tread footprint pattern that has a footprint shape factor of 1.25 or less approaching 1.0.

6. The all season radial pneumatic passenger or light truck tire of claim 5 wherein the tread has an equatorial centerplane EP and the apex of the "V" or chevron shape is centered on the EP.

7. The all season radial pneumatic passenger or light truck tire of claim 5 wherein the direction tread is asymmetrical having the apex of the "V" or chevron shape lying between a row of shoulder elements and an equatorial centerplane of the tread.

8. The all season radial pneumatic passenger or light truck tire of claim 5 wherein the leading edge of the shoulder elements is inclined at an angle $\theta_1$ of 10 degrees or greater relative to a lateral extending line perpendicular to an equatorial EP of the tread.

* * * * *